(12) United States Patent
Iverson et al.

(10) Patent No.: US 6,546,095 B1
(45) Date of Patent: Apr. 8, 2003

(54) AUTOMATED PROVISIONING OF TELEPHONE SERVICES

(75) Inventors: Tamara Iverson, Fremont, CA (US); Srinath Nayak Udupi, Sunnyvale, CA (US); Jennifer Alicastro, San Rafael, CA (US); Mark David Klein, Los Altos, CA (US)

(73) Assignee: America Online, Inc., Dulles, VA (US)

( * ) Notice: Subject to any disclaimer, the term of this patent is extended or adjusted under 35 U.S.C. 154(b) by 127 days.

(21) Appl. No.: 09/754,945

(22) Filed: Jan. 5, 2001

(51) Int. Cl.[7] .................................................. H04M 3/42
(52) U.S. Cl. ........................... 379/201.12; 379/201.02; 379/201.05
(58) Field of Search ........................ 379/201.01, 201.02, 379/201.05, 201.12, 900

(56) References Cited

U.S. PATENT DOCUMENTS

| | | | | |
|---|---|---|---|---|
| 5,416,833 A | * | 5/1995 | Harper et al. | 379/201.05 |
| 5,751,802 A | * | 5/1998 | Carr et al. | 379/201.12 |
| 5,883,946 A | * | 3/1999 | Beck et al. | 379/201.12 |
| 6,104,796 A | * | 8/2000 | Kasrai | 379/201.12 |
| 6,104,798 A | * | 8/2000 | Lickiss et al. | 379/201.12 |
| 6,275,570 B1 | * | 8/2001 | Homan et al. | 379/201.12 |
| 6,304,647 B1 | * | 10/2001 | Frost | 379/201.12 |
| 6,314,172 B1 | * | 11/2001 | Nightingale | 379/201.12 |
| 6,389,126 B1 | * | 5/2002 | Bjornberg et al. | 379/201.12 |
| 6,393,116 B1 | * | 5/2002 | Kaiser et al. | 379/201.12 |
| 6,411,697 B1 | * | 6/2002 | Creamer et al. | 379/201.12 |

* cited by examiner

Primary Examiner—Harry S. Hong
(74) Attorney, Agent, or Firm—Glenn Patent Group; Michael A. Glenn

(57) ABSTRACT

A system and method are provided for automatically provisioning a user's telephone service (e.g., a complementary network service). A request to add, change or disconnect a service element or feature is received at a web server, telephone server or other entry point (e.g., resubmit server). A generic order object is created to identify the service feature(s) to be affected, how it is to be provisioned, the user's service provider (e.g., LEC (Local Exchange Carrier), wireless carrier) and may provide additional information needed to complete the provisioning. The generic order object is automatically converted into a form specific to the provider. When a response is received from the service provider, the system may update the status of the order to indicate success, notify the user of the order status, re-submit an order that was unsuccessful, notify an operator if intervention is required, initiate resubmission of the order, etc.

48 Claims, 4 Drawing Sheets

AUTOMATED PROVISIONING OF TELEPHONE SERVICES

BACKGROUND

This invention relates to the field of telephone service provisioning. More particularly, a system and methods are provided for automatically provisioning a user's telephone service.

Traditionally, when a telephone user or subscriber desires a change to his or her telephone service—to add or remove a service feature—significant human intervention is required to implement the change. In particular, when a subscriber requests a change through an entity other than the subscriber's actual telephone service provider (e.g., a local telephone company or LEC (Local Exchange Carrier)), some human interaction is required between the entity and the service provider.

The more human activity that is required to effect the change, the greater chance there is for delay and error. For example, the subscriber may have to make one call to a company representative to order the change, another call to ascertain the order status, yet another call if the change is not made as requested, etc. In addition, the entity receiving the order may have to manually relay the order to the subscriber's service provider, the service provider may have to contact the entity to obtain additional details of the change or report a status, the entity may have to re-submit the order if it is incomplete or otherwise could not be completed by the service provider, a conflicting telephone service feature may be active (e.g., call forwarding may already be configured to forward the subscriber's calls to a number other than the number indicated in a new request), an LOA (Letter of Agency) may be needed so that a service provider can act on the subscriber's behalf, manually entered data may have been entered incorrectly, etc.

SUMMARY

In one embodiment of the invention a system and methods are provided for automatically provisioning a subscriber's telephone service to add, change or remove a service feature. When the subscriber requests a change, the necessary details to effect the change are gathered and an electronic order is generated. The order is placed in a proper format for the user's local telephone service provider and is electronically communicated to the service provider. A status is returned from the service provider and may be communicated to the subscriber, may be used to initiate a replacement order if additional information is needed, may cause a billing record to be generated, and may be used to update a database of subscriber orders.

More specifically, in a present embodiment of the invention a request to add a telephone service feature (e.g., a basic service element or complementary network service feature) is received at a telephone server, network server or other entry point into the automated provisioning system. For example, a person may wish to sign up for a centralized voice mail service, which requires call forwarding to be added to the subscriber's existing telephone service. An order is generated and saved in a database, the status of which will be updated as the order is processed. A generic order object is created and placed in an export queue for the subscriber's telephone service provider (e.g., a local exchange carrier, a wireless carrier). The generic order object may identify the responsible service provider, specify a suitable forward-to number (e.g., to which the forwarded calls are to be delivered for recording), etc. A transport module configured to interface with the service provider then converts the generic order object into a specific order object having a format compatible with the service provider's system, and then forwards the object to the provider. A response is received (which may indicate the expected date of completion for a successful order or a reason for failure for an unsuccessful order), the database is updated accordingly and the status is communicated to the subscriber. If the order was unsuccessful, a process may be initiated to resubmit it, which may require additional information from the subscriber and/or intervention by a customer service operator, depending on the reason for the failure. In one embodiment of the invention, the system may test the user's service to ensure that the order was successful or determine that the provisioning was successful by detecting use of the provisioned feature.

DETAILED DESCRIPTION

Figure 1:
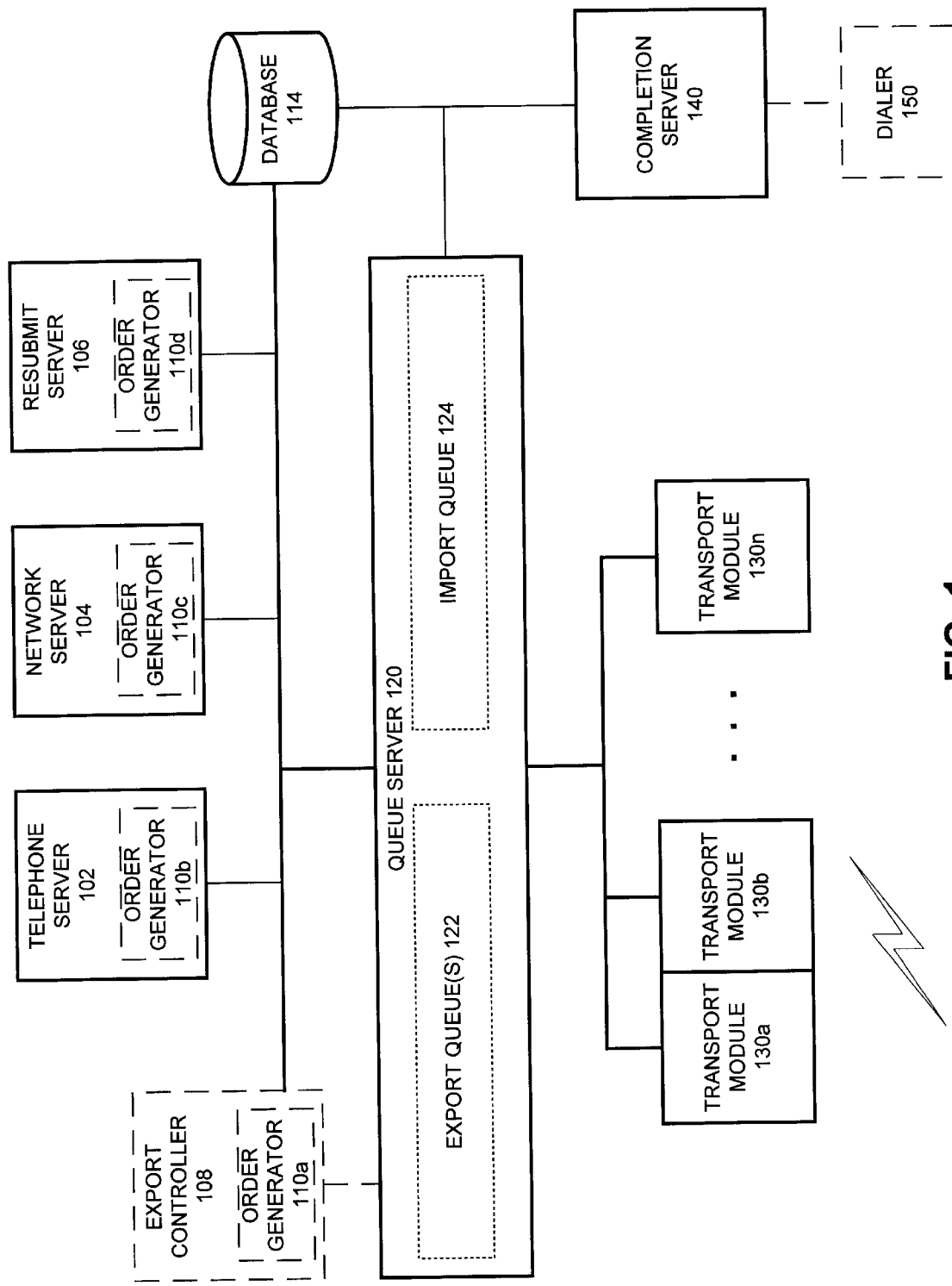
FIG. 1 is a block diagram depicting an automated provisioning system in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general- or special-purpose computer or group of computers. Details of such devices (e.g., processor, memory, data storage, display) may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention a system and methods are provided for automatically provisioning a service feature for a telephone subscriber. Provisioning may be necessary, for example, to add a new feature (e.g., call forwarding, call waiting, a second telephone line), change a feature (e.g., alter a ring cycle—the pattern or timing for ringing a telephone, change to a different voice mail provider) or remove a feature (e.g., remove call waiting, disconnect telephone service). In this embodiment, once the subscriber submits a request or an authorized entity submits a request on behalf of the subscriber, the system performs the provisioning in a substantially automated fashion, without further human intervention unless an error is encountered. Intervention may be required, for example, if additional information is needed from the subscriber (e.g., further authorization, a password).

In a present embodiment of the invention, when a service request is received an order is automatically generated and recorded in a database, and the order is placed in an export queue for communication to the subscriber's telephone service provider (e.g., the LEC (Local Exchange Carrier) or wireless carrier). A transport module converts or formats the order as necessary in order to enable electronic bonding between the system and the service provider. In the electronic bonding process the order is passed to the service provider in the appropriate form.

The service provider returns a status to the system, which may indicate that the order has been fulfilled, that it should be completed on or by a specified date, that an error occurred, what is needed to resolve the error, etc. The transport module places the status in a system import queue for action by a completion server. The completion server updates the order status in the database and may take various other actions. For example, the completion server may notify the subscriber of the status, test the subscriber's service to ensure the change was successful, elicit further information from the subscriber if needed, forward the status to a customer service operator for intervention, initiate or enable resubmission of the order or a replacement order, generate a billing record, etc.

FIG. 1 is a block diagram of one embodiment of an automatic call provisioning system according to one embodiment of the invention. The various elements of the illustrated system may be geographically or logically combined or separated in varying manners as will be evident to one skilled in the art.

In the illustrated embodiment of the invention, telephone server 102 and network server 104 are configured to receive requests for additions, alterations or disconnections of telephone subscribers' service features. The requests may be directly received from subscribers and/or from subscriber's authorized representatives. Telephone server 102 may be an interactive voice response device (IVR), while network server 104 may be a web server, data server or other computer system configured for electronic access through a web browser or other suitable user interface.

Resubmit server 106 is employed in a present embodiment of the invention to facilitate resubmitted or replacement orders. A resubmitted order may be necessary, for example, if a subscriber's telephone service provider was not able to complete an order because additional information was needed. An embodiment of the invention may include any number of telephone servers, network servers and/or resubmit servers.

In the embodiment of FIG. 1, telephone server 102, network server 104 and resubmit server 106 each include order generator 110, which is configured to generate a generic order object for a subscriber order. Illustratively, a generic order object includes information needed to complete an order. Thus, for an order to activate call forwarding, a generic order object may include the subscriber's telephone number (i.e., where calls are presently received), a feature code or identifier to identify the service feature (i.e., call forwarding), the telephone number to which calls are to be forwarded, an identifier of the subscriber's telephone service provider (e.g., the subscriber's LEC or wireless carrier), an action identifier indicating what action is requested for the feature (e.g., add, change, remove).

The inclusion of order generator 110 in each of servers 102, 104, 106 therefore allows the servers to take service requests, generate generic order objects and send the order objects to queue server 120 for export to the subscribers' service providers.

In one alternative embodiment of the invention, however, order generators may be omitted from telephone server 102, network server 104 and resubmit server 106. In this alternative embodiment, export controller 108 may be employed to receive order information from the servers and perform the order generation. Or, the export controller may cull new orders stored in database 114 by the telephone, network and/or resubmit server. In another alternative embodiment, an order generator may be included in queue server 120, described below, rather than or in addition to order generators within telephone server 102, network server 104, resubmit server 106 and/or elsewhere.

Database 114, in the illustrated embodiment, stores orders generated by the various telephone, network and resubmit servers, and updates their status as they are processed through the system. Database 114 may also store other types of information, such as subscriber data, area codes and telephone numbers, procedures to be followed or information needed to provision a subscriber's telephone service, etc. Database 114 may therefore comprise a number of separate data servers or data collections and may exchange data with various components of the system and/or external entities. For example, database 114 may receive new telephone numbers that can be assigned to subscribers, may be updated with new area codes, new prefixes, new stored procedures to aid in provisioning, etc.

Queue server 120 stores generic order objects in one or more export queues 122 for transport to telephone service providers, and stores order statuses and responses from the service providers in import queue 124. Updates to database 114 and the addition of new generic order objects to queue server 120 may be linked (e.g., transactionally) for the sake of consistency. Thus, both actions may fail or succeed together and constitute one transaction.

Transport modules 130a–130n are configured to take generic order objects from an export queue 122 and generate customized order objects specifically for the telephone service provider that will receive the orders. A customized order object may also be termed a specific order object. In the illustrated embodiment of the invention, each telephone service provider may require that it be provided with orders matching a specified form. For example, one LEC or wireless carrier may require its specific order objects to be received in the form of spreadsheets. Other LECs may require flat text files, transactional or non-transactional messages, files generated by a particular word processor, files adhering to a specific format such as FCIF (Flexible Computer Interface Format), XML (eXtensible Markup Language), HTML (HyperText Markup Language), etc. The transport modules also receive order responses or statuses from the service providers and route them to queue server 120 (for import queue 124). Various communication protocols may be employed between a particular transport module and a service provider or queue server 120, such as SMTP (Simple Mail Transport Protocol), HTTP (HyperText Transport Protocol) or HTTPS (Secure HyperText Transport Protocol), FTP (File Transfer Protocol), MQ (Message Queue) Series, MSMQ (Microsoft Message Queue), etc.

In this embodiment of the invention a separate transport module may be used to interface with each telephone service provider. The transports modules may operate on different computer systems or may be co-located on a shared system.

When a response or order status is placed in import queue 124, completion server 140 is responsible for retrieving it, updating the corresponding order in database 114, and/or taking other action. For successful orders, completion server 140 may notify the subscriber (e.g., via electronic mail, facsimile, telephone) and/or display an updated status on a web page or other computer system interface. For unsuccessful orders, completion server 140 may notify the subscriber and request any additional information needed by the telephone service provider. For example, the subscriber's telephone line may have a password or access code associated with it, which the subscriber may need to provide in order to enable the service provider to complete the order. For unsuccessful orders the completion server may also notify a customer service operator, particularly if intervention is needed to enable the order to be completed. The customer service operator may be prompted to call the subscriber, or vice versa, in order to resolve any problems.

After an unsuccessful order, resubmit server 106 may be employed to facilitate the resubmission of the order with any additional information that is needed by the service provider. A resubmitted order may be initiated by a customer service operator or may be automatically initiated when the subscriber provides the requested information (e.g., through telephone server 102 or network server 104).

In one embodiment of the invention, dialer 150 is configured to test a service feature affected by a subscriber's request. For example, if a subscriber orders call waiting, after a response from the responsible service provider is received and processed by completion server 140, dialer 150 may be instructed to call the subscriber's telephone number and determine if the call is being forwarded as requested. Dialer 150 may similarly be used to ensure that a service feature that was to be initiated or disconnected is actually initiated or disconnected, etc. Dialer 150 may be configured to automatically perform its testing when a successful status message is retrieved from import queue 124, may be configured to initiate testing after a certain date (e.g., a date by which the service provider indicated an order would be implemented), to test with particular frequency until successful, to halt testing if the subscriber requests a stop, etc. Dialer 150 may also play a welcome message for a subscriber or provide other information.

In another embodiment of the invention, the success of a provisioning order may be determined through the detection of the use of a telephone service feature affected by the provisioning. Thus, if an automated provisioning process is applied to add call forwarding to a subscriber's telephone line (e.g., to forward calls to a centralized voice mail system), and a call is detected (at the voice mail system) as having been forwarded in accordance with the provisioning request, this may be used as confirmation of the provisioning order. If no usage of the provisioned feature is detected within a configurable period of time, a customer service operator may be prompted to investigate.

In one method of operating an automatic provisioning system such as that of FIG. 1, a request for adding, changing or removing a telephone service feature is received at telephone server 102 or network server 104. The subscriber may, for example, wish to initiate voice mail service with an organization that operates the system, which may require the addition of a call forwarding feature to the subscriber's existing telephone service. Or, the subscriber may just wish to add, change or remove a service feature (e.g., call waiting, caller id, call blocking). As another example, a third party authorized by the subscriber to change the subscriber's service may connect to the system to use order generator 110 to initiate automatic provisioning to add, change or remove a service feature.

An embodiment of the invention may be implemented for provisioning virtually any aspect of a subscriber's telephone service, whether wired or wireless, including complementary network service (CNS) features. Complementary network services include telephone service features provided to end subscribers by regional bell operating companies (RBOCs) and may be distinguished from basic service elements (BSE).

Figure 3:
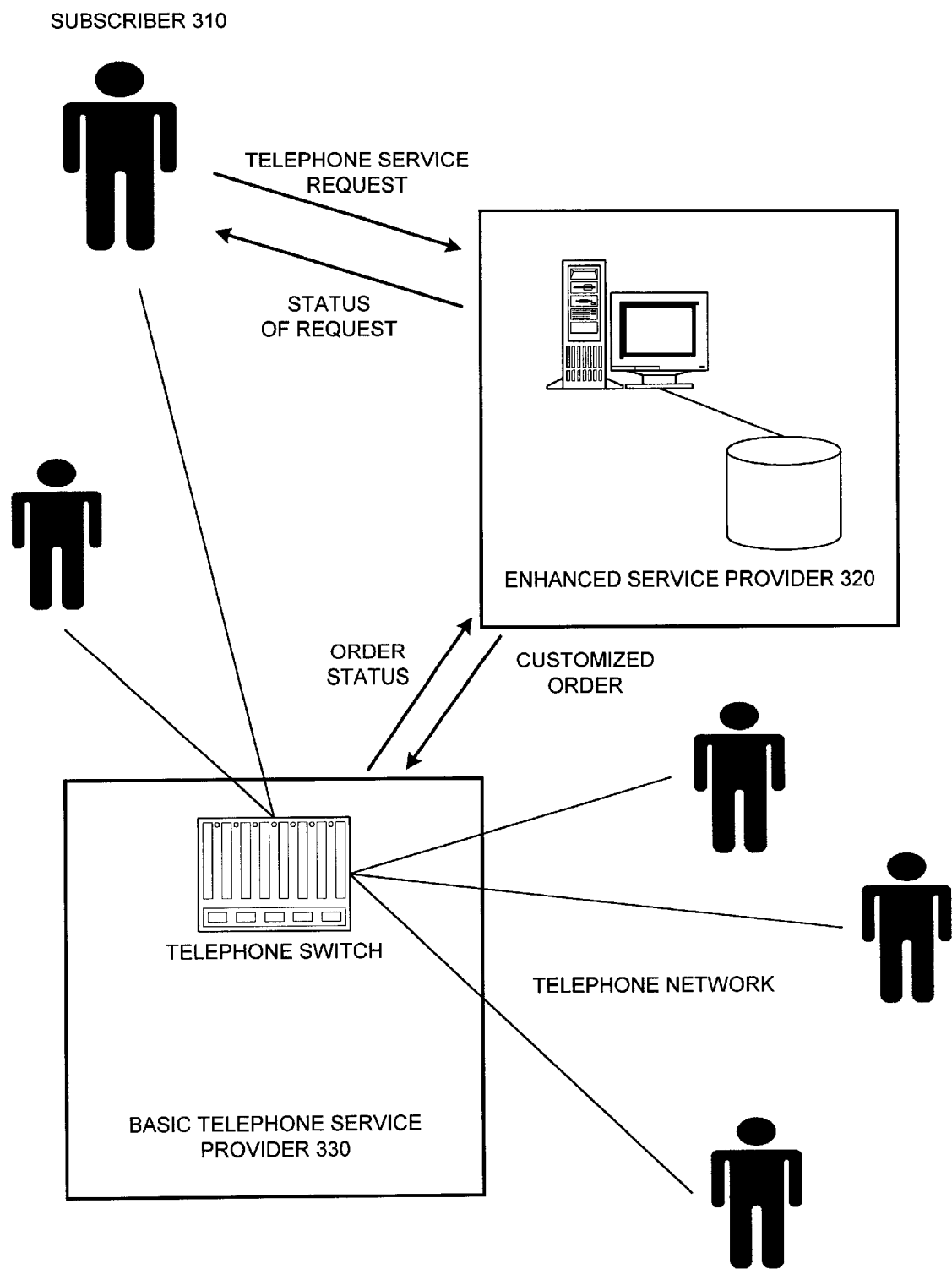
FIG. 3 illustrates a communication environment suitable for implementing an automated provisioning system according to an embodiment of the invention.

FIG. 3 depicts a communication environment in which an embodiment of the invention may be implemented. In the illustrated environment, telephone service subscriber 310 submits to enhanced service provider (ESP) 320 a request for his or her telephone service to be configured or re-configured. The enhanced service provider may, for example, be an entity capable of providing subscribers with enhanced telephone applications or services, such as voicemail, Internet call waiting, facsimile service, etc.

The ESP identifies the basic telephone service provider (e.g., an RBOC) that is responsible for basic service elements and/or complementary services within the subscriber's telephone network and automatically generates an electronic order or provisioning request. The order is placed into the desired or necessary format and is forwarded to basic telephone service provider 330. The basic telephone service provider returns a status of the order, which the enhanced service provider may give to the subscriber. In one embodiment of the invention ESP 320 and basic service provider 330 are distinct entities while, in another embodiment, one may comprise the other.

Figure 2A:
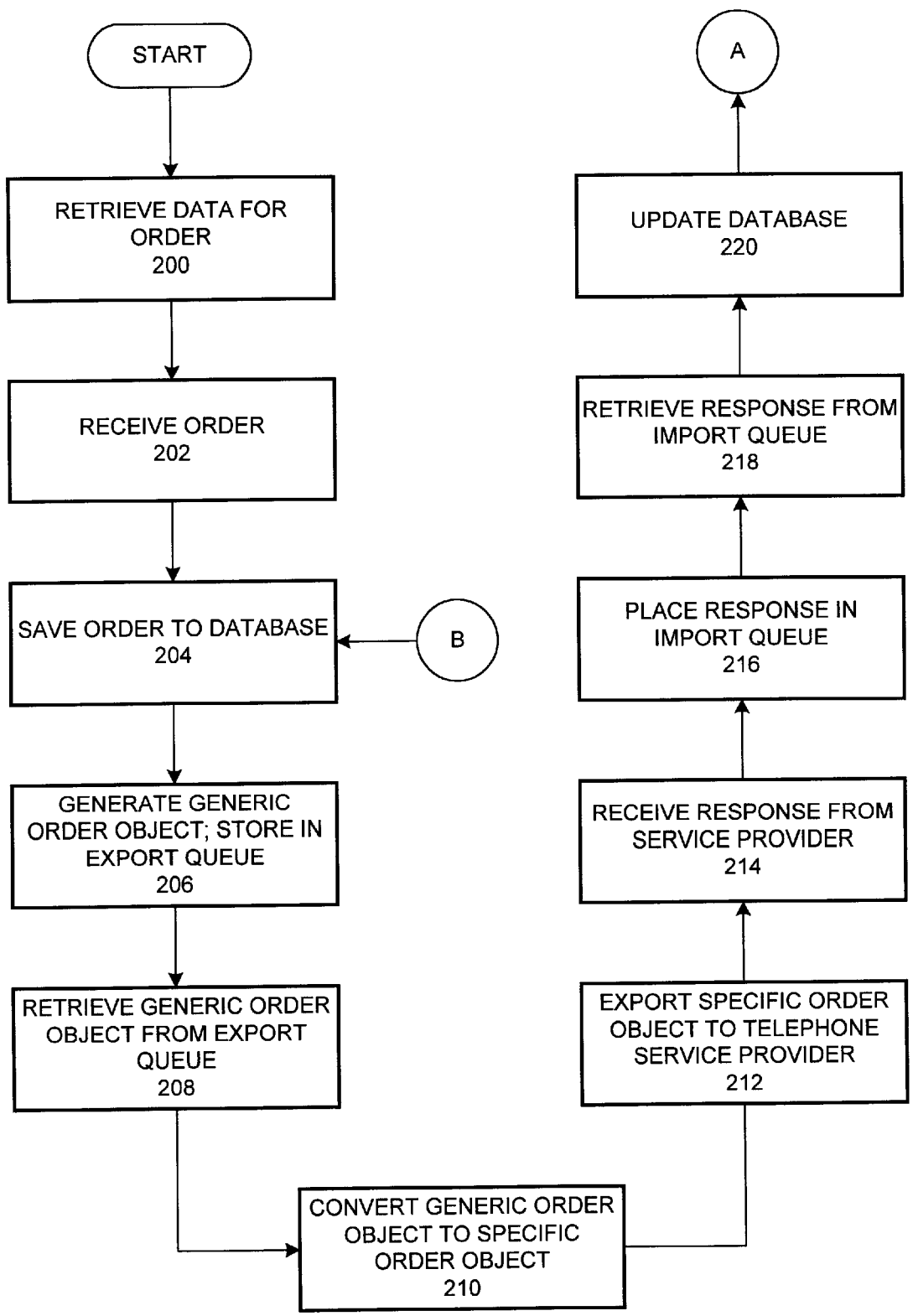
FIGS. 2A–B comprise a flowchart illustrating one method of automatically provisioning a telephone service feature in accordance with an embodiment of the invention.
Figure 2B:
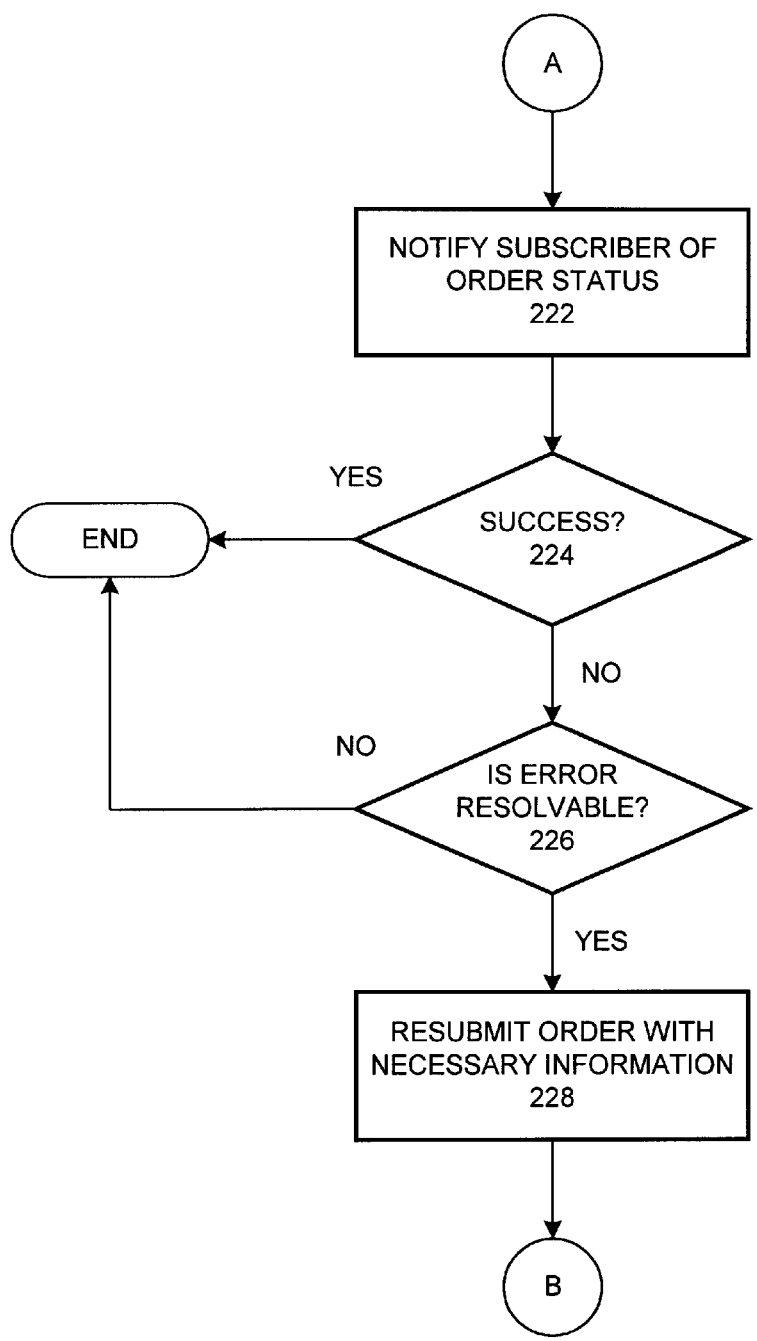

FIGS. 2A–B comprise a flow chart demonstrating a method of operating the automatic provisioning system of FIG. 1 according to one embodiment of the invention. In the illustrated method the system is used to add a call waiting service feature to a subscriber's telephone service. Although this embodiment involves a subscriber's initiation of changes to his or her service, in another embodiment any authorized representative of the subscriber may initiate the provisioning.

In state 200, a person connects to the system (e.g., telephone server 102 or network server 104) to subscribe to voice mail service (or to change his or her existing voice mail service). In particular, the type of voice mail service requested by the user is a centralized or network-based service in which voice mail messages are recorded at a central location (e.g., rather than on a recorder located at the subscriber's home or office). Illustratively, this type of voice mail service requires calls to the subscriber to be forwarded to a telephone number at the central location. At the forward-to number, a voice message from the caller can then be recorded. The service may be configured to forward all calls placed to the subscriber, to forward calls when the subscriber's existing line is busy or there is no answer, etc.

As part of taking an order, the system may verify that the person submitting the order has authority to make the desired change to the subscriber's telephone service. Thus, if the order is being received from the subscriber, the system may compare the telephone number from which the caller is calling (which may be learned through caller id) to the telephone number for which the order is being placed. If an entity other than the subscriber is submitting the order, that entity may be required to provide proof of authorization (e.g., a password associated with the telephone number, a digital certificate, a recorded authorization made by the subscriber).

In a present embodiment of the invention, the order request must be received in a call from the telephone number that is to be affected (e.g., the number that is to be provided with call forwarding). In one alternative embodiment, however, a subscriber may request telephone services for one telephone line while calling from some other telephone number or line, but may be required to show some proof of authorization to make the request or some control over the line to be serviced (e.g., by calling back from that line to confirm the request). Thus, if a subscriber submits her request through network server 104, telephonic contact may also be required from her to prove that she has control over the service for the telephone number and/or confirm the request.

In state 202 the system saves the order information to a database. The order information may include information such as an identity of the subscriber, the subscriber's telephone number (and/or other contact information), the service change that is being requested, etc. For each new order, a new database object may be created to represent the order. The database object may be updated as an order progresses (e.g., when it is exported to a telephone service provider, when an order status is received from the service provider, when the order is fulfilled).

In state 204 the system retrieves data needed to complete the order, if any, from the same or a different database. For example, the system may refer to a database to determine which telephone service provider or local exchange carrier (LEC) is responsible for the subscriber's telephone service. In addition, when the automatic provisioning system is being used to add call forwarding, a new telephone line or another feature requiring a new telephone number, the system may retrieve a suitable (e.g., forward-to) number for the subscriber, which may depend on the subscriber's geographical area, the level of service requested (e.g., depending on the level of service, the subscriber may be assigned a local number, a toll number or a toll-free number). Forwarding numbers may be assigned on the basis of NPANXX (Numbering Plan Area—Numbering Plan Exchange). The system may also refer to the database to determine the procedure to follow or the information that is needed to perform automatic provisioning for the order. Thus, in state 204 the system retrieves any data that may be needed to complete the order.

The order generated by the system may include any number of service features, for which any action (i.e., add, change, remove) may be requested. Thus, if a person requests one level of service a first set of service changes may be ordered; if he or she requests a different level of service a different set of changes may be ordered.

In state 206 the system (e.g., order generator 110) generates a generic order object. Illustratively, the order object is generated on the server that received or produced the order request (e.g., telephone server 102, network server 104, resubmit server 106). The order object is generic in that it contains information needed to complete the order, regardless of which telephone service provider is associated with the subscriber's service. In other words, the generic order object is not customized for a particular service provider. In one alternative embodiment, instead of creating the generic order object itself, the server that received the order request and/or assembled the information needed to create an order object may forward the information to a central module or server responsible for generating generic order objects.

After the generic order object is created, it is placed in an export queue and the status of the order is updated in the database. In the illustrated embodiment of the invention, separate export queues are maintained for each telephone service provider, and so the generic order object is placed in a queue associated with the responsible provider. Further, multiple export queues may be maintained for a provider. This may be done to segregate different types of orders (e.g., original versus resubmitted orders), to enforce different priorities for different orders, or may be done for performance reasons (e.g., in case of an error in one queue). For example, a new generic order object for a particular service provider may normally be placed in one export queue, but may be moved to a second export queue if it cannot be processed (e.g., because it has an invalid format or contains invalid data). Objects in the second queue may receive specialized handling (e.g., to correct an error) or may be discarded. In an alternative embodiment of the invention, however, an export queue may be shared between two or more service providers.

In state 208, a transport module configured for the telephone service provider responsible for the subscriber's telephone service retrieves the generic order object from the export queue. The transport module may remove any number of generic objects at one time, and in any order.

In state 210 the transport module takes the contents of the generic order object and creates a specific order object that is tailored to the form desired by the responsible service provider. As described above, telephone service providers may require that orders be received in specific forms and with specific content (e.g., codes, identifiers). Thus, depending on the telephone service provider, one generic order object may be converted into a spreadsheet, a flat text file, an FCIF file, a transactional or non-transactional message (e.g., MQ or MSMQ), etc.

A specific order object may include codes that are meaningful to a service provider. Thus, an action or status code of "NEW" may indicate that an identified feature is to be added to the specified telephone line, while a "DIS" code may specify that the feature is to be disconnected and a "CHG" code may signify a change to a service feature. Illustratively, to replace a feature (e.g., to change the number to which a subscriber's calls are forwarded), a single code may be used (e.g., "CHG"), or two separate action codes may be specified (e.g., a "DIS" and a "NEW"). The creation of specific order objects with appropriate codes and other information thus allows the system to tailor an order to whichever service provider will receive the order.

In state 212 the specific order object is transferred or transmitted to the responsible telephone service provider. Illustratively, the transport module may act as a client to a server operated by the service provider, interact with the service provider's system through an automated transactional or non-transactional interface, via electronic mail, etc. Depending on the preferences of a service provider, a transport module may only transmit specific order objects when it has a threshold number to send. Thus, if specific order objects are sent in the form of a spreadsheet, for example, the transport module may wait until it has populated a spreadsheet with a particular number of orders.

In state 214 a status or other response is received from the service provider by the transport module. The response may include an order identification, a status code (e.g., indicating the status of the order) and/or other information. The response may indicate that the order was completed, that it is scheduled for completion on a specified or unspecified date, that the order could not be completed, etc. If the order could not be completed, the response may identify why the order failed (e.g., equipment failure, additional information is needed).

In state 216 the transport module places the response in an import queue. The transport module may convert the response from one form to another in order to ensure a specified format for further processing.

In state 218 a completion server retrieves the response from the import queue. Depending on the response (e.g., whether the order was successful or not), the completion server may take different actions. However, in the illustrated method of the invention at least two actions may be commonly taken for all responses.

In particular, in states 220–222, the system updates the database with, and notifies the subscriber or authorized representative (e.g., via electronic mail) of, the status of the order (e.g., successful, pending, scheduled for a certain date, failed, failed for a particular reason). If the subscriber responds to the status notification, the response may be sent to a customer service operator. In particular, the subscriber may be providing additional information needed to resubmit the order. If this can be determined by the system, it may extract the information (e.g., an access code or password assigned to the subscriber's telephone line) and automatically generate a resubmit order. In one embodiment of the invention the automated provisioning system may be configured to interact with (e.g., receive information from) a subscriber through a web or other network-based interface.

An order may thus be resubmitted by a customer service operator or the subscriber who generated the original request. When performing his or her own resubmission, a subscriber may connect to a network server (e.g., resubmit server 106 of FIG. 1) where suitable authentication may be performed for security purposes. During this self-resubmission process the subscriber may provide authorization to disconnect another telephone service feature, a password needed to complete the provisioning, etc.

In state 224, if the status of the order indicates that it was successful, then the illustrated procedure ends. Otherwise, in state 226 the system determines whether the reason for failure is resolvable. If so, the procedure continues at state 228. If, however, the problem is not resolvable, the illustrated procedure ends in a failure state. Unresolvable problems may be identified by exception codes (e.g., returned with the order status). One type of unresolvable problem is that a requested telephone service feature is not available at the responsible service provider's switch. Other problems may include restrictions on the subscriber's account, a pending disconnection of telephone service for the subscriber, etc.

In state 228 the order is resubmitted if possible. The resubmission process may require action by a customer service operator and/or the subscriber or the subscriber's authorized representative. Illustratively, a password may be needed from the subscriber to complete an order, authorization may be needed from the subscriber to disconnect an existing conflicting feature (e.g., call forwarding to a different number), etc. If, for example, the subscriber has ordered a termination of service (or disconnection of a service feature), and the responsible telephone service provider reports that it could not disconnect the service, a customer service operator may take action to complete the disconnection. When an order is unsuccessful, the customer may have been advised why (e.g., in state 222) and, if the customer responds with requested information (e.g., to a customer service operator, through a web interface), the resubmission process can begin.

In general, a resubmitted order may include whatever information is needed to complete an order, and may be assembled by a customer service operator (e.g., through resubmit server 106) or may be generated automatically (e.g., through a resubmission procedure initiated by the subscriber at a web page). A resubmitted order may be generated after some necessary action is completed by the subscriber (e.g., payment of an overdue telephone bill) or the telephone service provider that will now allow the service provider to complete the order. When an order is resubmitted in state 228, the illustrated procedure returns to state 204 to try the provisioning process again.

In other embodiments of the invention, the system may take other action when an order response is received from a telephone service provider. For example, when an order is successful, the system may automatically generate a billing record for the subscriber or remove one in the case of the disconnection of a service feature. A subscriber may be billed directly, or charges may be added to the subscriber's telephone bill, credit card or other billing mechanism.

Further, the feature that was added, altered or removed may be tested. Thus, after an order is placed for new call forwarding service, the system may automatically place a call to the subscriber's existing telephone number (or several calls) to determine if it is being handled correctly.

A telephone service provider's action to complete a provisioning order may be fully or partially automated, depending on its own practices. As already described, the specific order objects given to a service provider may be intended to include all the information needed to complete the order and may be formatted according to the service provider's specifications. Thus, a specific order object may include any of the following: an action code indicating the action that is desired (e.g., add, change, remove a service feature), a feature code identifying the affected service element or feature, an identifier of the subscriber (e.g., name, address), the telephone number(s) being affected (e.g., existing telephone number, forward-to number), ring cycle, requested or desired completion date for the order, a digital certificate or other means of authentication, an order identifier, billing information, comments, etc. Checksums or other means of validating numbers included in a specific order object may also be included, which may be useful if the receiving service provider performs any manual processing of orders.

The response (e.g., status) from a service provider may be in a specific format or may be generic (e.g., similar for all providers). Specific responses may be converted into a generic form by the transport modules or the completion server. Illustratively, a service provider's response may include any of the following: a status code and/or a confirmation code for the order, a tracking number, the telephone number being provisioned, various dates (e.g., when the order was received, completed, or is scheduled to be completed), the order type (e.g., corresponding to the action code included in the specific order object), any exceptions (e.g., errors) that were encountered (e.g., the service provider is not responsible for the subscriber's telephone service), billing information, comments, etc.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of automatically provisioning a telephone subscriber's telephone service, comprising:

receiving a request at a first entity to configure a subscriber's telephone service;

identifying a telephone service provider responsible for said telephone service, wherein said telephone service provider is distinct from said first entity;

automatically generating an electronic order for said configuration;

transmitting said electronic order to the telephone service provider; and optionally, testing said configuration to determine if said provisioning was successful.

2. The method of claim 1, further comprising:

receiving a status of said order from the telephone service provider; and electronically communicating said status to the subscriber.

3. The method of claim 2, further comprising, if said status indicates that said telephone service configuration was unsuccessful:

generating a resubmit order; and transmitting said resubmit order to the telephone service provider.

4. The method of claim 3, wherein said resubmit order comprises information identified in said status.

5. The method of claim 1, further comprising:

creating an object in a database to record said order;

updating said database object to indicate that said order was submitted to the telephone service provider; and updating said database object to reflect an order status received from the telephone service provider.

6. The method of claim 1, further comprising:

receiving a status of said order from the telephone service provider; and automatically generating a billing record for the telephone subscriber.

7. The method of claim 1, wherein said receiving a request comprises:

receiving a connection from a subscriber at one of a telephone server, a network server and a resubmit server; and receiving from the telephone subscriber a request to configure a desired feature on the subscriber's telephone service.

8. The method of claim 7, wherein said feature is one of the set of:

call forwarding, call waiting, message waiting indication, and ring cycle.

9. The method of claim 1, wherein said identifying comprises determining the LEC (Local Exchange Carrier) or wireless carrier providing telephone service to the subscriber.

10. The method of claim 1, wherein said automatically generating comprises:

creating a generic order object identifying said telephone service configuration requested by the subscriber; and converting said generic order object into a specific order object having a format accepted by the telephone service subscriber.

11. The method of claim 10, wherein said transmitting comprises:

accumulating multiple specific order objects, including said specific order object; and submitting said multiple specific order objects to the telephone service provider.

12. A computer-implemented method of automatically provisioning a telephone subscriber's telephone service, comprising:

receiving a request to provision a subscriber's telephone service;

identifying the subscriber's telephone service provider;

generating a generic order object to order said provisioning from said service provider;

recording said order in a database object;

converting said generic order object to a specific order object having a predetermined form;

exporting said specific order object to said service provider;

receiving a status of said order from said service provider; and updating said database object to reflect said status.

13. The method of claim 12, further comprising placing said generic order object in an export queue associated with said service provider.

14. The method of claim 12, further comprising informing the subscriber of said status.

15. The method of claim 12, further comprising testing said subscriber's telephone service to determine if said provisioning is complete.

16. The method of claim 12, wherein said request comprises a request for voice mail service, further comprising:

retrieving a voice mailbox telephone number from a database of telephone numbers.

17. The method of claim 12, wherein said receiving comprises:

receiving a connection from the subscriber at one of a telephone server, a network server and a resubmit server; and receiving a telephone service provisioning request from the subscriber, wherein said request comprises one of a request to add a telephone service feature, a request to change a telephone service feature and a request to remove a telephone service feature.

18. The method of claim 17, wherein said telephone server is an interactive voice response device.

19. The method of claim 12, wherein said receiving comprises:

receiving a connection from a customer service operator at one of a telephone server, a network server and a resubmit server; and receiving a telephone service provisioning request from the customer service operator, wherein said request comprises one of a request to add a telephone service feature, a request to change a telephone service feature and a request to remove a telephone service feature.

20. The method of claim 12, wherein said request to provision the subscriber's telephone service is received from an authorized representative of the subscriber.

21. The method of claim 12, wherein said identifying comprises searching a database of subscriber telephone numbers and associated telephone service providers.

22. The method of claim 12, wherein said generating a generic order object comprises:
   specifying a telephone service feature to be provisioned; and
   specifying a telephone number for which said feature is to be provisioned.

23. The method of claim 12, wherein said specific order object is one of the set of: a text file, a spreadsheet, a message and a flexible computer interface format file.

24. A method of provisioning telephone service for a user, comprising:
   receiving a generic order object representing an order to provision telephone service for a user;
   identifying a telephone service provider responsible for telephone service for the user;
   converting said generic order object into a specific order object tailored for said telephone service provider;
   connecting to said telephone service provider;
   transmitting said specific order object to said telephone service provider; and
   receiving a status of said order from said telephone service provider.

25. A computer readable storage medium storing instructions that, when executed by a computer, cause the computer to perform a method of automatically provisioning a telephone subscriber's telephone service, the method comprising:
   receiving a request at a first entity to configure a subscriber's telephone service;
   identifying a telephone service provider responsible for said telephone service, wherein said telephone service provider is distinct from said first entity;
   automatically generating an electronic order for said configuration;
   transmitting said electronic order to the telephone service provider; and
   optionally, testing said configuration to determine if said provisioning was successful.

26. A computer readable storage medium storing instructions that, when executed by a computer, cause the computer to perform a method of automatically provisioning a telephone subscriber's telephone service, the method comprising:
   receiving a request to provision a subscriber's telephone service;
   identifying the subscriber's telephone service provider;
   generating a generic order object to order said provisioning from said service provider;
   recording said order in a database object;
   converting said generic order object to a specific order object having a predetermined configuration;
   exporting said specific order object to said service provider;
   receiving a status of said order from said service provider; and
   updating said database object to reflect said status.

27. A computer readable storage medium containing a data structure configured to facilitate the automatic provisioning of a subscriber's telephone service, the data structure comprising:
   a subscriber telephone number to be provisioned;
   a feature identifier configured to identify a service feature to be provisioned; and
   an action identifier configured to indicate how said service feature is to be provisioned;
   wherein the data structure is automatically transmitted to a telephone service provider responsible for servicing telephone number, by an entity other than said telephone service provider and the subscriber.

28. The computer readable storage medium of claim 27, wherein said feature identifier is configured to identify either a complementary network service feature or a basic service element.

29. The computer readable storage medium of claim 27, wherein said feature identifier is configured to identify one of the following service features: call forwarding, message waiting indicator and ring cycle.

30. The computer readable storage medium of claim 27, wherein said action identifier indicates said service feature is to be provisioned in one of the following ways: added, changed or disconnected.

31. A system for automatically provisioning a subscriber's telephone service, comprising:
   a server configured to receive a provisioning order for a subscriber's telephone service;
   an order generator configured to generate a generic order object from said provisioning order;
   a first export queue configured to temporarily store said generic order object;
   a transport module configured to:
     convert said generic order object into a specific order object having a form desired by a telephone service provider responsible for said telephone service; and
     transmit said specific order object to said service provider; and
   an import module configured to receive a status of said order from said service provider.

32. The system of claim 31, further comprising a database configured to track the status of said order, wherein said database is updated by said order generator and said import module.

33. The system of claim 32, wherein said database is updated transactionally, and wherein each said update transaction either completely fails or completely succeeds.

34. The system of claim 31, further comprising a test module configured to test said telephone service for completion of said order.

35. The system of claim 31, wherein said order generator is further configured to determine which telephone service provider, of multiple telephone service providers, is responsible for the subscriber's telephone service.

36. The system of claim 35, further comprising a queue server comprising multiple export queues, including said first export queue, wherein each of said multiple export queues is configured to store generic order objects for a different telephone service provider.

37. The system of claim 36, wherein said queue server further comprises an import queue configured to temporarily store said status.

38. The system of claim 31, wherein said server is one of a network server and a telephone server.

39. The system of claim 31, wherein said server is a resubmit server configured to resubmit a previous provisioning order to the system when a status of said previous provisioning order is unsuccessful.

40. The system of claim 31, wherein said order generator comprises a set of computer readable instructions executed on said server.

41. The system of claim 31, wherein said import module and said transport module are co-located.

42. An enhanced telephone service provider for automatically provisioning a subscriber's telephone service with a complementary telephone network service, comprising:

- a plurality of servers configured to provide one or more enhanced telephone network services to subscribers within a publicly switched telephone network, wherein one or more of said plurality of servers are coupled to a basic telephone service provider responsible for providing basic telephone service elements to said subscribers;
- a first server configured to receive a request to provision a first subscriber within the telephone network with a complementary telephone network service;
- an order generator configured to generate an order for said provisioning;
- a transport module configured to format said order into a form acceptable to said basic telephone service provider; and
- a communication module configured to:
    transmit said order to said basic telephone service provider; and
    receive from said basic telephone service provider a status of said order.

43. The enhanced telephone service provider of claim 42, wherein said complementary telephone network service comprises call forwarding.

44. The enhanced telephone service provider of claim 42, wherein a first server in said plurality of servers is configured to receive a call directed to the first subscriber, further comprising:

- a first memory configured to store a voicemail message directed to the first subscriber from another subscriber.

45. A telecommunication system, comprising:

- a telephone service provider comprising switching equipment for switching telephone calls, wherein said telephone service provider is coupled to a public switched telephone network;
- a first server configured to receive from a subscriber a request to provision the subscriber's service within said telephone network;
- an order generator configured to generate an order for said provisioning;
- a transport module configured to format said order into a form acceptable to said telephone service provider; and
- a communication module configured to:
    transmit said order to said telephone service provider; and
    receive from said telephone service provider a status of said order.

46. A system for automatically provisioning a subscriber's telephone service, comprising:

- means for receiving a request to configure a subscriber's telephone service;
- means for identifying a telephone service provider responsible for providing said telephone service;
- means for generating an electronic order for said configuration;
- means for transmitting said order to the telephone service provider; and
- optionally, means for testing said configuration to determine if said provisioning was successful.

47. The system of claim 46, further comprising means for converting said order into a format acceptable to the telephone service provider.

48. The system of claim 46, further comprising means for receiving a status of said order from the telephone service provider.

* * * * *